UNITED STATES PATENT OFFICE 2,460,409

2-BENZIMINAZOYL-AMINO PYRIMIDINES

Frederick Robert Basford, Francis Henry Swinden Curd, and Francis Leslie Rose, Blackley, Manchester, England, assignors to Imperial Chemical Industries Limited, a corporation of Great Britain No Drawing. Application October 4, 1946, Serial No. 701,092. In Great Britain October 9, 1945

9 Claims. (Cl. 260—251)

This invention relates to the manufacture of new pyrimidine compounds which are useful as chemotherapeutic agents and particularly as parasiticidal agents, especially against the parasites that cause malaria.

The said new compounds are pyrimidine derivatives of the formula

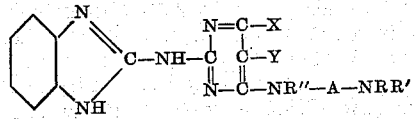

wherein X and Y, which are not necessarily alike, each represent hydrogen or a hydrocarbon radical or X and Y together represent a divalent aliphatic hydrocarbon radical which forms with the 5- and 6-carbon atoms an alicyclic ring; wherein the benz ring of the benziminazolyl group may be unsubstituted or may bear one or more non-acidic substituents such, for example, as hydrocarbon radicals (which themselves may optionally bear substituents and which may be attached to the benz radical directly or indirectly as, for instance, through an oxygen, sulphur or nitrogen atom or may be fused thereto as in the case of a naphthiminazolyl radical), halogen atoms or nitro or cyano groups; wherein R″ is hydrogen or an alkyl or simply substituted alkyl group, for example an alkoxyalkyl or dialkylaminoalkyl group; wherein A is a linking group which is aliphatic or alicyclic or aliphatic-carbocyclic and may be substituted, for example, by hydrocarbon radicals, hydroxy or alkoxy groups or dialkylaminoalkyl groups and where A or part of A is an aliphatic chain it may be interrupted by oxygen, sulphur or nitrogen atoms; and wherein NRR′ is a strongly basic amino or substituted amino group such as alkylamino or dialkylamino or piperidino or other strongly basic nitrogen-containing heterocyclic group.

We make the said compounds by a process comprising the interaction of a diamine NHR″—A—NRR′ with an appropriate 2-(benziminazolyl-(2′)-amino)- pyrimidine bearing in the 5- and 6-positions the groups X and Y respectively and in the 4-position a labile group such as a halogen atom or a hydrocarbon radical which is attached by means of an ether or thioether linkage, for example, an alkoxy, aryloxy or alkylmercapto group.

The reaction is conveniently brought about by heating the reagents together, optionally in presence of a solvent or diluent. If desired, the benziminazolylaminopyrimidine or the diamine may be used in the form of a salt, such as the hydrochloride or acetate. Also if desired, the reaction may be carried out in the presence of an acid-binding agent such as sodium hydroxide.

The reagents are conveniently, but not necessarily, used in approximately stoichiometric proportions. If desired, a large excess of the amine may be used so that it functions as a solvent or diluent.

A further feature of the invention is a modified process wherein the basic substituent NR″—A—NRR′ is introduced by stages. Thus the benziminazolylamino-pyrimidine compound carrying a labile group in the 4-position is brought into reaction with an amino-compound of the form NHR″—A′—B, where A represents either the whole or a part of the linking group A defined above and where B stands for a reactive group which is then converted by known methods into the group NRR′ or into a group A″—NRR′ such that A′ and A″ together constitute the linking group A. For example, the group B may be a hydroxy group or a derivative thereof which is, or is readily convertible to, a reactive ester thereof, such as a halide, this then being brought into reaction with an amine NHRR′ or an amino-substituted amine NH₂—A‴—NRR′ or a hydroxy- or mercapto-substituted amine HO—A‴—NRR′ or HS—A‴—NRR′ (or an alkali metal derivative of such a hydroxy or mercapto compound) such that A′—NH—A‴, A′—O—A‴ or A′—S—A‴ constitutes the linking group A previously mentioned. Another alternative is to bring the labile group in the 4-position of the benziminazolylaminopyrimidine compound into reaction with an acylated diamine NHR″—A′—NHAc and then to hydrolyse off the acyl group. Further, if desired, the free amino group so generated may be modified, as by alkylation, conversion to a heterocyclic group such as piperidino or by bringing it into reaction with a halogeno-substituted amine Hal—A‴—NRR′ such that A′—NH—A‴ constitutes the linking group A.

The 4-halogeno-2-benziminazolylaminopyrimidine compounds used as starting materials may conveniently be made from the corresponding 4-hydroxy-2-benziminazolylaminopyrimidine compounds by the action of for example, phosphorus pentahalides or oxyhalides. The 4-hydroxy-2-benziminazolylaminopyrimidines may be obtained by interaction of the corresponding 2-cyanamino-4-hydroxypyrimidine and an o-phenylene diamine or by interaction of the corresponding benziminazolylguanidines and an appropriate formylacetic ester. The alternative starting materials containing ether or thioether groups can readily be made by the interaction of the 4-halogeno-derivatives with appropriate hydroxy or mercapto compounds or with alkali metal derivatives of such compounds.

The invention is illustrated but not limited by the following examples, in which the parts are by weight.

Example 1

2 parts of the hydrochloride of 2-(benziminazolyl-(2')-amino)-4-chloro-6-methylpyrimidine, 4 parts of β-diethylaminoethylamine and 0.01 part of potassium iodide are stirred and heated together at 150–160° C. for 6 hours. The melt is then cooled and extracted with dilute hydrochloric acid. The extract is clarified with charcoal and then made alkaline with ammonia. A white solid is precipitated. This is crude 2-(benziminazolyl-(2')-amino)-4-β-diethylaminoethylamino-6-methylpyrimidine, whose structure may be represented by the following formula—

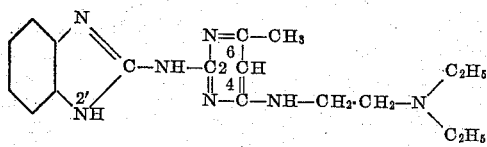

It is filtered off and purified by recrystallisation from benzene when it has M. P. 198–200° C.

Working in a similar manner but starting from other appropriate 4-halogeno-2-benziminazolyl-aminopyrimidines and appropriate diamines, the following further compounds can be made; the table indicates the constitution of the compounds and their respective melting points.

3-diethylaminopropylamine and 0.03 part of potassium iodide are heated together at 155–165° C. for 6 hours. The mixture is then dissolved in dilute acetic acid, the solution is filtered and the filtrate is made alkaline with sodium hydroxide. It is then filtered and the solid is washed with water and dried. It crystallises from a mixture of benzene and ligroin and has M. P. 183–184° C.

Example 14

4 parts of 4-chloro-2-benziminazolyl-(2')-amino-6-methylpyrimidine, 8 parts of γ-dibutylamino-propylamine and 0.04 part of potassium iodide are heated in an oil bath at 160–170° C. for 8 hours. The resulting reaction mixture is dissolved in a mixture of 20 parts of water and 10 parts of hydrochloric acid, the solution is filtered and the filtrate is made alkaline with sodium hydroxide. The precipitated product is filtered off, washed with water, dried and crystallised from a mixture of benzene and ligroin, M. P. 158° C.

In the claims below, the expression "acidic substituents" refers to radicals commonly recognized as ionizable, salt-forming, acid radicals, as typified by carboxy and sulfo radicals.

We claim:

1. A compound of the pyrimidine series characterized by carrying a benziminazolyl-amino radical in the 2-position, said benziminazolyl-amino radical being free of acidic substituents; and carrying the radical of a diamine in the 4-position, said diamine radical having the form —NH—A—NRR', wherein NRR' is a strongly basic radical selected from the group consisting of primary, secondary and tertiary amine radicals and heterocyclic nitrogenous base radicals, while

| Ex. No. | Constitution of Compound | Melting Point |
|---|---|---|
| | | ° C. |
| 2 | 2-(5'-(6')-chlorobenziminazolyl-(2')-amino)-4-β-diethylaminoethylamino-6-methylpyrimidine | 204–205 |
| 3 | 2-(5'-(6')-chlorobenziminazolyl-(2')-amino)-4-γ-diethylaminopropylamino-6-methylpyrimidine | 193 |
| 4 | 2-(5'-(6')-chlorobenziminazolyl-(2')-amino)-4-γ-dimethylaminopropylamino-6-methylpyrimidine | 196–197 |
| 5 | 2-(5'-(6')-chlorobenziminazolyl-(2')-amino)-4-γ-dibutylaminopropylamino-6-methylpyrimidine | 166–167 |
| 6 | 2-(5'-(6')-chlorobenziminazolyl-(2')-amino)-4-γ-(N-methyl-N-isopropylamino)-propylamino-6-methylpyrimidine; (The Cl-atom is located in one of the positions 5', 6') | 203 |
| 7 | 2-(5'-(6')-chlorobenziminazolyl-(2')-amino)-4-β-piperidinoethylamino-6-methylpyrimidine | 223 |
| 8 | 2-(5'-(6')-chlorobenziminazolyl-(2')-amino)-4-γ-(β-diethylaminoethoxy)-propylamino-6-methylpyrimidine, | 162 |
| 9 | 2-(5'-(6')-methoxybenziminazolyl-(2')-amino)-4-γ-diethylaminopropylamino-6-methylpyrimidine | 164–166 |
| 10 | 2-(5'-(6')-methoxybenziminazolyl-(2')-amino)-4-γ-dibutylaminopropylamino-6-methylpyrimidine | 158–159 |
| 11 | 2-(5'-(6')-methylbenziminazolyl-(2')-amino)-4-β-diethylaminoethylamino-6-methylpyrimidine | 210 |
| 12 | 2-(naphtho-1'':2'':4':5'-iminazolyl-(2')-amino)-4-β-diethylaminoethylamino-6-methylpyrimidine, | 226 |

Example 13

3 parts of 4-chloro-2(5'-methylbenziminazolyl-2'-amino)-6-methylpyrimidine and 5.2 parts of A is a linking radical selected from the group consisting of aliphatic, alicyclic and aliphatic-carbocyclic bivalent radicals.

2. As new compounds, the pyrimidine derivatives of the formula—

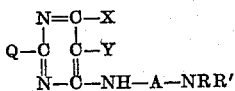

wherein Q stands for a benziminazolyl-amino group which is free of acidic substituents, A is a linking radical selected from the group consisting of aliphatic, alicyclic and aliphatic-carbocyclic bivalent radicals, NRR' is a strongly basic radical selected from the group consisting of primary, secondary and tertiary amine radicals and heterocyclic nitrogenous base radicals, while X and Y represent members selected from the group consisting of hydrogen and hydrocarbon radicals.

3. As new compounds, the pyrimidine derivatives of the formula—

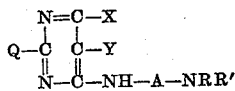

wherein Q stands for a benziminazolyl-amino group which is free of acidic substituents, A is an aliphatic link joining the N-atom of the NH group to the N-atom of the NRR' group and interposing therebetween at least two carbon atoms, NRR' is a dialkylamino group, while X and Y represent members selected from the group consisting of hydrogen and hydrocarbon radicals.

4. As new compounds, pyrimidine derivatives of the formula—

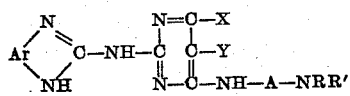

wherein Ar designates an ortho-attached arylene radical of not more than 10 cyclic carbon atoms and whose cyclic carbon atoms carry substituents selected from the group consisting of hydrogen, chlorine, methyl and methoxy; R and R' are lower alkyl radicals, A is an aliphatic link joining the N-atom of the NH group to the N-atoms of the NRR' group and interposing therebetween at least two carbon atoms, while X and Y represent members selected from the group consisting of hydrogen and hydrocarbon radicals.

5. As new compounds, 6-methyl-4-dialkyl-aminoalkylamino pyrimidines bearing in the 2-position a 2-benziminazolyl-amino radical.

6. 2-[6'-chlorobenziminazolyl-(2') - amino]-4-γ-dimethyl-aminopropylamino-6-methylpyrimidine.

7. 2-[6'-chlorobenziminazolyl-(2')-amino]-4 - β-diethylaminoethylamino-6-methylpyrimidine.

8. 2-[6'-chlorobenziminazolyl-(2')-amino]-4 - β-piperidino-ethylamino-6-methylpyrimidine.

9. A process for the manufacture of compounds as defined in claim 1, which comprises reacting a 4-halogeno pyrimidine compound bearing in the 2-position a 2-benziminazolyl-amino radical, with a diamine of the formula NH₂—A—NRR', wherein NRR' is a strongly basic radical selected from the group consisting of primary, secondary and tertiary amine radicals and heterocyclic nitrogenous base radicals, while A is a linking radical selected from the group consisting of aliphatic, alicyclic and aliphatic-carbocyclic bivalent radicals.

FREDERICK ROBERT BASFORD.
FRANCIS HENRY SWINDEN CURD.
FRANCIS LESLIE ROSE.

No references cited